United States Patent
Fujisawa et al.

(10) Patent No.: US 10,480,715 B2
(45) Date of Patent: Nov. 19, 2019

(54) GAS SUPPLY DEVICE AND METHOD FOR STARTING OPERATION OF GAS SUPPLY DEVICE

(71) Applicant: Kobe Steel, Ltd., Hyogo (JP)

(72) Inventors: Akitoshi Fujisawa, Kobe (JP); Kenji Nagura, Takasago (JP)

(73) Assignee: Kobe Steel, Ltd., Hyogo (JP)

(*) Notice: Subject to any disclaimer, the term of this patent is extended or adjusted under 35 U.S.C. 154(b) by 0 days.

(21) Appl. No.: 16/113,983

(22) Filed: Aug. 27, 2018

(65) Prior Publication Data

US 2019/0086031 A1 Mar. 21, 2019

(30) Foreign Application Priority Data

Sep. 15, 2017 (JP) ................................. 2017-177595

(51) Int. Cl.
*F17C 5/00* (2006.01)
*B60K 15/067* (2006.01)
(Continued)

(52) U.S. Cl.
CPC ............ *F17C 5/007* (2013.01); *B60K 15/067* (2013.01); *B60S 5/02* (2013.01); *F17C 5/06* (2013.01);
(Continued)

(58) Field of Classification Search
CPC ...... F17C 5/007; F17C 5/06; F17C 2221/012; F17C 2221/013; F17C 2221/033;
(Continued)

(56) References Cited

U.S. PATENT DOCUMENTS 4,531,558 A * 7/1985 Engel ............... B60K 15/03006
123/525
7,624,770 B2 * 12/2009 Boyd ..................... F17C 5/007
141/11
(Continued)

FOREIGN PATENT DOCUMENTS

EP  3 339 716 A1  6/2018
FR  2 960 041 A1  11/2011
(Continued)

OTHER PUBLICATIONS

The extended European search report issued by the European Patent Office dated Jan. 4, 2019, which corresponds to European Patent Application No. 18188410.7-1010 and is related to U.S. Appl. No. 16/113,983.

*Primary Examiner* — Patrick M. Buechner
*Assistant Examiner* — Michael J. Melaragno
(74) *Attorney, Agent, or Firm* — Studebaker & Brackett PC

(57) ABSTRACT

A gas supply device for supplying a hydrogen gas to a dispenser of a hydrogen station includes: a refrigerant flow path through which a refrigerant for cooling the gas before being discharged from the dispenser flows; a refrigerator that can cool the refrigerant; a cooling device that can cool the refrigerant by latent heat when liquid hydrogen changes to the hydrogen gas; and a control unit that performs control to activate the refrigerator while stopping the cooling device when a condition set in advance is satisfied after performing control to activate the cooling device in activation of the hydrogen station.

18 Claims, 8 Drawing Sheets

(51) Int. Cl.
  *B60S 5/02* (2006.01)
  *F17C 5/06* (2006.01)
  *B60K 15/03* (2006.01)

(52) U.S. Cl.
  CPC ............... *B60K 2015/03315* (2013.01); *F17C 2221/012* (2013.01); *F17C 2221/013* (2013.01); *F17C 2221/033* (2013.01); *F17C 2227/0135* (2013.01); *F17C 2227/0157* (2013.01); *F17C 2227/0355* (2013.01); *F17C 2265/065* (2013.01); *F17C 2270/0139* (2013.01)

(58) Field of Classification Search
  CPC ...... F17C 2227/0135; F17C 2227/0157; F17C 2227/0355; F17C 2265/065; F17C 2270/0139; B60K 15/067; B60K 2015/03315; B60S 5/02
  USPC .......................................................... 222/3
  See application file for complete search history.

(56) References Cited

U.S. PATENT DOCUMENTS

| | | | | |
|---|---|---|---|---|
| 7,987,877 | B2* | 8/2011 | Bavarian | F17C 7/00 137/255 |
| 8,671,997 | B2* | 3/2014 | Allidieres | F17C 5/06 141/104 |
| 2003/0164202 | A1* | 9/2003 | Graham | B60S 5/02 141/98 |
| 2005/0109419 | A1* | 5/2005 | Ohmi | B01D 53/46 141/4 |
| 2005/0236145 | A1* | 10/2005 | Arai | F28D 1/0461 165/133 |
| 2006/0180240 | A1* | 8/2006 | Niedzwiechi | B60P 3/14 141/231 |
| 2007/0261756 | A1* | 11/2007 | Handa | F17C 5/007 141/4 |
| 2010/0307636 | A1* | 12/2010 | Uemura | F17C 5/06 141/4 |
| 2012/0159970 | A1* | 6/2012 | Reese | F17C 5/007 62/53.2 |
| 2012/0216915 | A1* | 8/2012 | Takata | F17C 5/06 141/82 |
| 2013/0125568 | A1* | 5/2013 | Chalk | F17C 5/02 62/115 |
| 2014/0102587 | A1 | 4/2014 | Nagura et al. | |
| 2016/0153615 | A1 | 6/2016 | Allidieres | |
| 2016/0348840 | A1 | 12/2016 | Nagura et al. | |
| 2018/0306381 | A1 | 10/2018 | Fujisawa et al. | |

FOREIGN PATENT DOCUMENTS

| | | |
|---|---|---|
| JP | 2004-116619 A | 4/2004 |
| JP | 2011-174528 A | 9/2011 |
| WO | 2015/125585 A1 | 8/2015 |
| WO | 2018/104982 A1 | 6/2018 |

* cited by examiner

GAS SUPPLY DEVICE AND METHOD FOR STARTING OPERATION OF GAS SUPPLY DEVICE

FIELD OF THE INVENTION

The present invention relates to a gas supply device for supplying a gas to a dispenser of a gas station, and a method for starting an operation of the gas supply device.

BACKGROUND ART

In recent years, vehicles using a hydrogen gas such as fuel cell vehicles and hydrogen vehicles have been developed. As such vehicles are developed, hydrogen stations for charging a tank of the vehicle with a hydrogen gas are becoming increasingly common. As one example of such a hydrogen station, Japanese Patent Application Laid-Open No. 2015-158213 describes a hydrogen station including a gas supply system for supplying a hydrogen gas and a dispenser for supplying the hydrogen gas supplied from the gas supply system to a tank of a vehicle according to a predetermined protocol. Such a hydrogen station needs to supply the hydrogen gas discharged from the dispenser to the tank of the vehicle with the hydrogen gas being cooled to a predetermined temperature. Therefore, the gas supply system disclosed in Japanese Patent Application Laid-open No. 2015-158213 includes a refrigerant flow path through which a refrigerant for cooling the hydrogen gas in the dispenser flows, and a refrigerator for cooling the refrigerant flowing through the refrigerant flow path. With this configuration, the hydrogen gas in the dispenser is supplied to the tank of the vehicle while being cooled to a predetermined temperature by the refrigerant flowing through the refrigerant flow path.

Meanwhile, when the hydrogen station disclosed in Japanese Patent Application Laid-open No. 2015-158213 is stopped, the refrigerator is also stopped. Accordingly, the temperature of the refrigerant in the refrigerant flow path rises due to external heat input. Therefore, when activating the hydrogen station again, it is necessary to cool the refrigerant flowing through the refrigerant flow path to the predetermined temperature before supplying the hydrogen gas from the dispenser to the vehicle. In this case, for example, it is considered to cool the refrigerant flowing through the refrigerant flow path to the predetermined temperature by activating the refrigerator and thereafter to activate the hydrogen station such that the hydrogen gas can be supplied from the dispenser to the vehicle. However, when activating the hydrogen station by such a method, there is a concern that time required for the activation is prolonged because it takes time for the refrigerator to cool the refrigerant.

SUMMARY OF THE INVENTION

An object of the present invention is to provide a gas supply device capable of reducing the time required for activating the gas station and a method for starting an operation of the gas supply device.

A gas supply device according to one aspect of the present invention is a gas supply device for supplying a gas to a dispenser of a gas station. The gas supply device includes: a refrigerant flow path through which a refrigerant for cooling a gas before being discharged from the dispenser flows; a refrigerator configured to cool the refrigerant; a cooling device configured to cool the refrigerant by latent heat of a liquefied gas; and a control unit configured to perform control to activate the cooling device and the refrigerator when the gas station is activated. The control unit performs control to stop the cooling device when a condition set in advance is satisfied.

A method for starting an operation of a gas supply device according to another aspect of the present invention is a method for starting an operation of a gas supply device including: a refrigerant flow path through which a refrigerant for cooling a gas before being discharged from a dispenser of a gas station flows; a refrigerator configured to cool the refrigerant; and a cooling device configured to cool the refrigerant by latent heat of a liquefied gas. The method includes: performing control to activate the cooling device; and performing control to activate the refrigerator while performing control to stop the cooling device when a predetermined condition is satisfied after the cooling device is activated.

A method for starting an operation of a gas supply device according to another aspect of the present invention is a method for starting an operation of a gas supply device including: a refrigerant flow path through which a refrigerant for cooling a gas before being discharged from a dispenser of a gas station flows; a refrigerator configured to cool the refrigerant; and a cooling device configured to cool the refrigerant by latent heat of a liquefied gas. The method includes: performing control to activate the cooling device and the refrigerator; and performing control to stop the cooling device when a predetermined condition is satisfied after the cooling device and the refrigerator are activated.

DESCRIPTION OF EMBODIMENTS

One embodiment of the present invention will be described below with reference to the drawings. Here, for convenience of description, each figure referred to below is a simplified illustration of main components among components of a hydrogen station according to the present embodiment. Therefore, the hydrogen station according to the present embodiment can include any component that is not illustrated in each figure referenced herein.

First Embodiment

Figure 1:
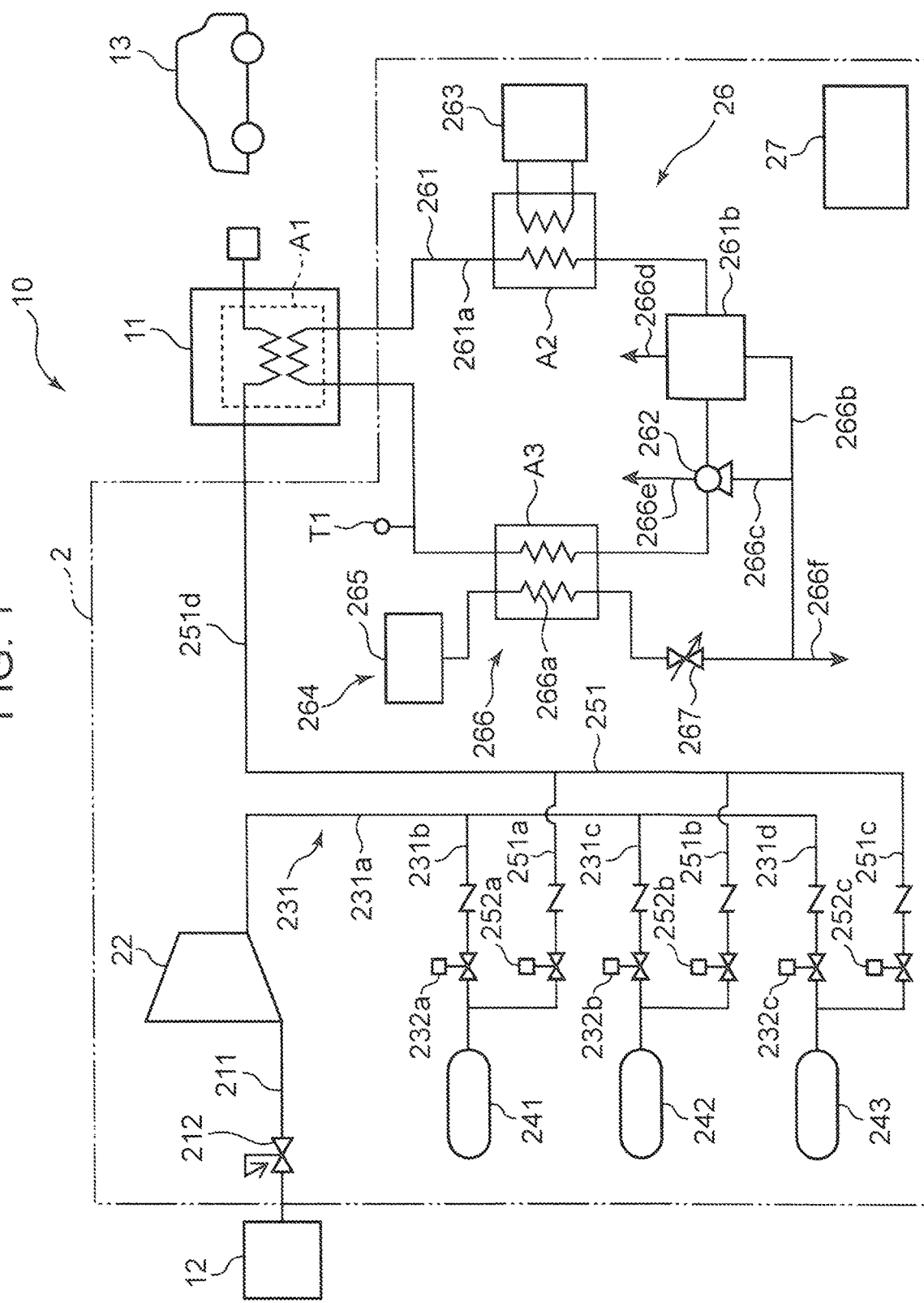
FIG. 1 is a schematic diagram illustrating a configuration of a gas supply device according to a first embodiment.

FIG. 1 is a diagram schematically illustrating a configuration of a hydrogen station 10 according to a first embodiment of the present invention. The hydrogen station 10 includes a gas supply device 2 and a dispenser 11, which is a charging facility.

The gas supply device 2 compresses a hydrogen gas to generate a compressed gas, and supplies the compressed gas to the dispenser 11. In the present embodiment, as illustrated in FIG. 1, the hydrogen gas produced in a gas production device 12 is supplied to the gas supply device 2, and the gas supply device 2 compresses the hydrogen gas to generate the compressed gas.

Note that a supply source for supplying the hydrogen gas to the gas supply device 2 may not be the gas production device 12. For example, the hydrogen gas may be supplied from a tank member storing the hydrogen gas to the gas supply device 2.

In the present embodiment, since the gas supply device 2 is a component of the hydrogen station 10, the gas production device 12 produces and supplies the hydrogen gas to the gas supply device 2. However, the gas production device 12 is not limit to this example. For example, the gas production device 12 may be a device for producing a liquefied gas other than the hydrogen gas, or may be a device for producing a gas other than the liquefied gas.

In the present embodiment, the gas production device 12 is independent of the hydrogen station 10, but the gas production device 12 is not limited to this example. The hydrogen station 10 may include the gas production device 12.

The dispenser 11 is a facility for receiving the hydrogen gas supplied from the gas supply device 2. A tank of a vehicle 13 entering the hydrogen station 10 is charged with the hydrogen gas through the dispenser 11. The vehicle (tank-mounted device) 13 is, for example, a fuel cell vehicle.

The gas supply device 2 includes an inflow side flow path 211, an inflow side valve member 212, a compressor 22, an outflow side flow path 231, outflow side valve members 232a to 232c, accumulators 241 to 243, a supply path 251, supply path valve members 252a to 252c, a cooling unit 26, and a control unit 27. The accumulators 241 to 243 may be omitted. Each constituent member will be described in order below.

The inflow side flow path 211 is a flow path into which the hydrogen gas produced in the gas production device 12 flows. The inflow side flow path 211 connects the gas production device 12 and a suction side of the compressor 22.

The inflow side valve member 212 is a valve for regulating a flow rate of the hydrogen gas supplied from the gas production device 12 to the compressor 22. The inflow side valve member 212 is attached to an intermediate portion of the inflow side flow path 211. In the present embodiment, the inflow side valve member 212 includes a pressure reducing valve for keeping a pressure on the suction side of the compressor 22 at a predetermined pressure.

The compressor 22 compresses the hydrogen gas flowing in from the suction side to generate the compressed gas. The compressor 22 includes, for example, a motor and a compression unit. The compression unit is driven in accordance with rotation of the motor to suck the hydrogen gas in the inflow side flow path 211. As the compressor 22, a reciprocating compressor is preferably employed, but other types of compressor, for example, a screw compressor may be employed.

The outflow side flow path 231 is a flow path for sending the compressed gas of the hydrogen gas generated in the compressor 22 to the accumulators 241 to 243. The outflow side flow path 231 includes a common path 231a and individual paths 231b to 231d. The common path 231a is connected to a discharge portion of the compressor 22. The individual paths 231b to 231d respectively connect the common path 231a to the accumulators 241 to 243 described later. The hydrogen gas flowing from the compressor 22 through the common path 231a and the individual paths 231b to 231d to the accumulators 241 to 243 is temporarily stored in the accumulators 241 to 243, respectively.

The outflow side valve members 232a to 232c are valves for switching which of the accumulators 241 to 243 the hydrogen gas discharged from the compressor 22 is supplied to. The outflow side valve members 232a to 232c are attached to the individual paths 231b to 231d, respectively. The outflow side valve members 232a to 232c are configured to open and close the individual paths 231b to 231d, respectively.

The accumulators 241 to 243 are containers for storing the hydrogen gas therein. Each of the accumulators 241 to 243 is designed at the same design pressure (for example, 82 MPa). Note that in the present embodiment, the gas supply device 2 includes three accumulators 241 to 243, but the present embodiment is not limited to this configuration, and the number of accumulators is arbitrary.

The supply path 251 is a flow path for sending the hydrogen gas stored in the accumulators 241 to 243 to the dispenser 11. The supply path 251 includes a plurality of individual paths 251a to 251c and a common path 251d. The plurality of individual paths 251a to 251c is respectively connected to portions on a side of the accumulators 241 to 243 (downstream side) than the outflow side valve members 232a to 232c in the individual paths 231b to 231d. The common path 251d is connected to the individual paths 251a to 251c and extends to the dispenser 11.

The supply path valve members 252a to 252c are valves for switching from which one of the accumulators 241 to 243 to supply the hydrogen gas to the dispenser 11. The supply path valve members 252a to 252c are attached to the individual paths 251a to 251c of the supply path 251, and are configured to open and close the individual paths 251a to 251c, respectively.

The cooling unit 26 has a function of cooling the hydrogen gas before being discharged from the dispenser 11. When supplying the hydrogen gas from the dispenser 11 to the tank of the vehicle 13, the dispenser 11 discharges the hydrogen gas such that a pressure of the hydrogen gas is boosted according to a predetermined protocol. At this time, the dispenser 11 discharges the hydrogen gas cooled to a predetermined temperature by the cooling unit 26.

The cooling unit 26 includes a refrigerant flow path 261, a pump 262, a refrigerator 263, and a cooling device 264.

The refrigerant flow path 261 is a flow path through which a refrigerant for cooling the hydrogen gas before being discharged from the dispenser 11 flows. The refrigerant flowing through the refrigerant flow path 261 is, for example, nonfreezing brine.

The refrigerant flow path 261 includes a circulation path 261a and a refrigerant tank 261b. The circulation path 261a is a flow path formed in a ring through which the refrigerant can circulate. The refrigerant tank 261b is provided in the middle of the circulation path 261a, and stores part of the refrigerant circulating through the circulation path 261a.

The pump 262 causes the refrigerant to circulate by pressure-feeding the refrigerant in the refrigerant flow path 261. The pump 262 is provided in the circulation path 261a.

A temperature sensor T1 is attached to the circulation path 261a of the refrigerant flow path 261. The temperature sensor T1 is a sensor that detects a temperature of the refrigerant circulating through the refrigerant flow path 261. Note that the temperature sensor T1 may be attached to the refrigerant tank 261b of the refrigerant flow path 261.

The dispenser 11 incorporates a heat exchanger A1. The common path 251d of the supply path 251 and the circulation path 261a of the refrigerant flow path 261 are connected to the heat exchanger A1. That is, the heat exchanger A1 is configured to allow the hydrogen gas flowing through the common path 251d of the supply path 251 and the refrigerant flowing through the circulation path 261a of the refrigerant flow path 261 to flow without mixing with each other such that heat is exchanged between the hydrogen gas and the refrigerant. This causes the hydrogen gas flowing through the supply path 251 to be cooled to a predetermined temperature by the refrigerant flowing through the circulation path 261a in the dispenser 11.

Note that in the present embodiment, part of the circulation path 261a is placed in the dispenser 11, whereby heat is exchanged in the dispenser 11 between the hydrogen gas and the refrigerant, but this is not restrictive. For example, the circulation path 261a may be placed such that heat is exchanged between the hydrogen gas flowing through the common path 251d and the refrigerant flowing through the circulation path 261a on an upstream side of the dispenser 11.

The refrigerator 263 can cool the refrigerant flowing through the refrigerant flow path 261. In the present embodiment, as illustrated in FIG. 1, part of the refrigerator 263 and the circulation path 261a of the refrigerant flow path 261 constitute a heat exchanger A2 incorporated in the gas supply device 2. That is, in the heat exchanger A2, a cooling fluid flowing through the refrigerator 263 and the refrigerant flowing through the circulation path 261a of the refrigerant flow path 261 flow without mixing with each other, and heat is exchanged between the cooling fluid and the refrigerant. Therefore, in the heat exchanger A2, the refrigerator 263 can cool the refrigerant whose temperature has been increased by the heat exchange with the hydrogen gas in the heat exchanger A1.

The cooling device 264 can cool the refrigerant flowing through the refrigerant flow path 261 by latent heat of vaporization of a liquefied gas. Note that the liquefied gas mentioned here refers to a liquid which is a gaseous fluid at the normal temperature becoming a liquid by being cooled or compressed. In the present embodiment, the cooling device 264 is configured to cool the refrigerant flowing through the refrigerant flow path 261 by latent heat of vaporization of liquefied nitrogen. Note that the cooling device 264 may be configured to cool the refrigerant flowing through the refrigerant flow path 261 by latent heat of vaporization of the liquefied gas such as an oxygen gas and an argon gas.

The cooling device 264 includes a liquefied gas tank 265, a liquefied gas flow path 266, and a flow rate regulating valve 267.

The liquefied gas tank 265 is a tank in which liquid nitrogen is stored.

The liquefied gas flow path 266 is a flow path through which the liquid nitrogen stored in the liquefied gas tank 265 flows out. The liquefied gas flow path 266 includes a heat exchanger portion 266a, a tank introduction portion 266b, a tank lead-out portion 266d, a pump introduction portion 266c, a pump lead-out portion 266e, and a discharge portion 266f.

The heat exchanger portion 266a is a portion in which heat is exchanged between the liquid nitrogen flowing through the heat exchanger portion 266a and the refrigerant flowing through the refrigerant flow path 261. The heat exchanger portion 266a is connected to the liquefied gas tank 265 such that the liquid nitrogen in the liquefied gas tank 265 can flow into the heat exchanger portion 266a. In the present embodiment, as illustrated in FIG. 1, the heat exchanger portion 266a and the circulation path 261a of the refrigerant flow path 261 constitute a heat exchanger A3 incorporated in the gas supply device 2. That is, in the heat exchanger A3, the liquefied nitrogen flowing through the heat exchanger portion 266a and the refrigerant flowing through the circulation path 261a of the refrigerant flow path 261 flow without mixing with each other, and heat is exchanged between the liquid nitrogen and the refrigerant. Therefore, the heat exchanger portion 266a can cool the refrigerant by using latent heat generated by the liquid nitrogen being vaporized by the heat exchange between the liquid nitrogen and the refrigerant.

Figure 2:
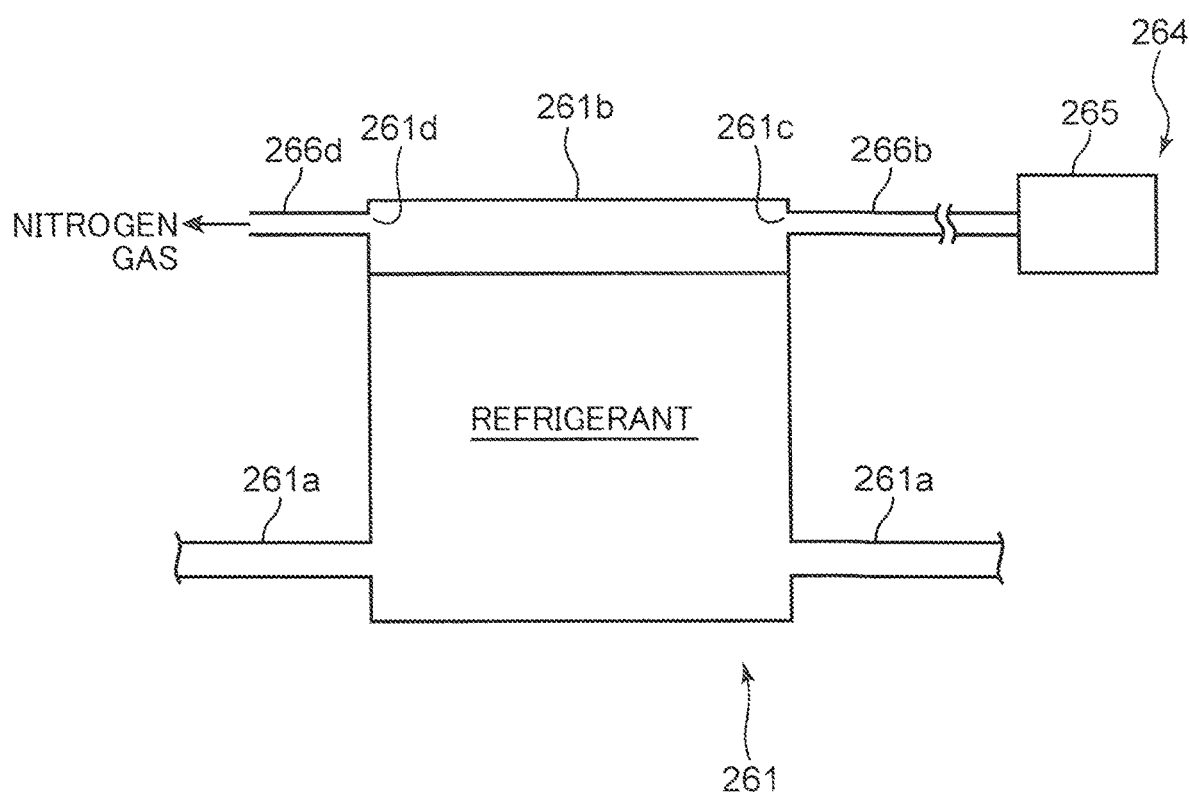
FIG. 2 is a schematic diagram illustrating a configuration of a refrigerant tank provided in the gas supply device according to the first embodiment.

The tank introduction portion 266b is a portion that introduces a nitrogen gas generated by vaporization of the liquid nitrogen in the heat exchanger portion 266a into the refrigerant tank 261b. One end of the tank introduction portion 266b is connected to the heat exchanger portion 266a, whereas the other end of the tank introduction portion 266b is connected to the refrigerant tank 261b. In the present embodiment, as illustrated in FIG. 2, a predetermined amount of refrigerant is stored within the refrigerant tank 261b, and a gas inlet 261c is formed above the stored refrigerant. The other end of the tank introduction portion 266b is connected to the gas inlet 261c such that the nitrogen gas is introduced into the refrigerant tank 261b through the gas inlet 261c.

The tank lead-out portion 266d is a portion that leads out the nitrogen gas introduced into the refrigerant tank 261b to the outside of the refrigerant flow path 261. In the present embodiment, as illustrated in FIG. 2, the tank lead-out portion 266d is connected to a gas outlet 261d provided in the refrigerant tank 261b. The gas outlet 261d is provided above the refrigerant stored in the refrigerant tank 261b. The nitrogen gas is led to the outside of the refrigerant tank 261b through the gas outlet 261d. In a case where the refrigerant tank 261b is not hermetically closed, the tank lead-out portion 266d may not be provided. In this case, the nitrogen gas leaks from a portion where the inside of the refrigerant tank 261b communicates with the outside air.

The pump introduction portion 266c is a portion for introducing into a casing of the pump 262 the nitrogen gas generated by the vaporization of the liquid nitrogen in the heat exchanger portion 266a. In the present embodiment, one end of the pump introduction portion 266c is connected to an intermediate portion of the tank introduction portion 266b, whereas the other end of the pump introduction portion 266c is connected to the casing of the pump 262. With this configuration, part of the nitrogen gas flowing out from the heat exchanger portion 266a diverges into the pump introduction portion 266c while flowing through the tank introduction portion 266b, and then flows into the casing of the pump 262.

Note that one end of the pump introduction portion 266c may not be connected to the intermediate portion of the tank introduction portion 266b. For example, one end of the pump introduction portion 266c may be directly connected to the heat exchanger portion 266a.

The pump lead-out portion 266e is a portion that leads the nitrogen gas introduced into the casing of the pump 262 to the outside of the refrigerant flow path 261. The pump lead-out portion 266e is connected to the casing of the pump 262 so as to lead the nitrogen gas in the casing to the outside of the casing. In a case where the casing of the pump 262 is not hermetically closed, the pump lead-out portion 266e may not be provided. In this case, the nitrogen gas leaks from a portion where the inside of the casing communicates with the outside air.

The discharge portion 266f is a portion for discharging the nitrogen gas generated in the heat exchanger portion 266a to the outside of the gas supply device 2, except for the nitrogen gas introduced into the refrigerant tank 261b and the casing of the pump 262. The discharge portion 266f is connected to the tank introduction portion 266b so as to discharge part of the nitrogen gas flowing from the heat exchanger portion 266a to the tank introduction portion 266b. In the present embodiment, the discharge portion 266f is connected to a portion of the tank introduction portion 266b on an upstream side of a connection point between the tank introduction portion 266b and the pump introduction portion 266c.

The flow rate regulating valve 267 includes a valve member capable of regulating an opening. By regulating the opening of the flow rate regulating valve 267, the flow rate of the nitrogen gas in the liquefied gas flow path 266 can be regulated. In the present embodiment, the flow rate regulating valve 267 is attached to a portion of the tank introduction portion 266b on an upstream side of the connection point between the pump introduction portion 266c and the tank introduction portion 266b, the portion being on an upstream side of a connection point between the discharge portion 266f and the tank introduction portion 266b. With this configuration, when the flow rate regulating valve 267 is fully closed, the liquid nitrogen accumulated in the liquefied gas tank 265 is not discharged from the tank lead-out portion 266d, the pump lead-out portion 266e, and the discharge portion 266f, and the refrigerant is not cooled in the heat exchanger portion 266a. Meanwhile, when the flow rate regulating valve 267 is opened at a predetermined opening, the liquid nitrogen accumulated in the liquefied gas tank 265 is vaporized in the heat exchanger portion 266a and then discharged from the tank lead-out portion 266d, the pump lead-out portion 266e, and the discharge portion 266f. That is, the refrigerant is cooled by the latent heat of vaporization of the liquid nitrogen in the heat exchanger portion 266a.

Note that in the present embodiment, the flow rate regulating valve 267 is attached to a portion of the liquefied gas flow path 266 on a downstream side of the heat exchanger portion 266a, but this is not restrictive. The flow rate regulating valve 267 may be attached to a portion between the liquefied gas tank 265 and the heat exchanger A3.

The control unit 27 includes, for example, an unillustrated storage device including a read-only memory (ROM) and a random-access memory (RAM), and an arithmetic unit including a central processing unit (CPU) or a microprocessor unit (MPU). The control unit 27 performs various types of control as follows by the MPU or the like executing a program stored in the ROM or the like. Although the control unit 27 is represented with one rectangle in FIG. 1 for convenience of description, functions of the control unit 27 may be implemented by any method, and not all functions of the control unit 27 are implemented by one component.

The control unit 27 performs open/close control of the outflow side valve members 232a to 232c, open/close control of the supply path valve members 252a to 252c, start/stop control of the pump 262, start/stop control of the refrigerator 263, and opening regulating control of the flow rate regulating valve 267. Also, the control unit 27 receives temperature information detected by the temperature sensor T1, and determines whether the temperature information satisfies a predetermined condition.

Here, with reference to FIG. 3, a method for operating the hydrogen station 10 will be described.

Figure 3:
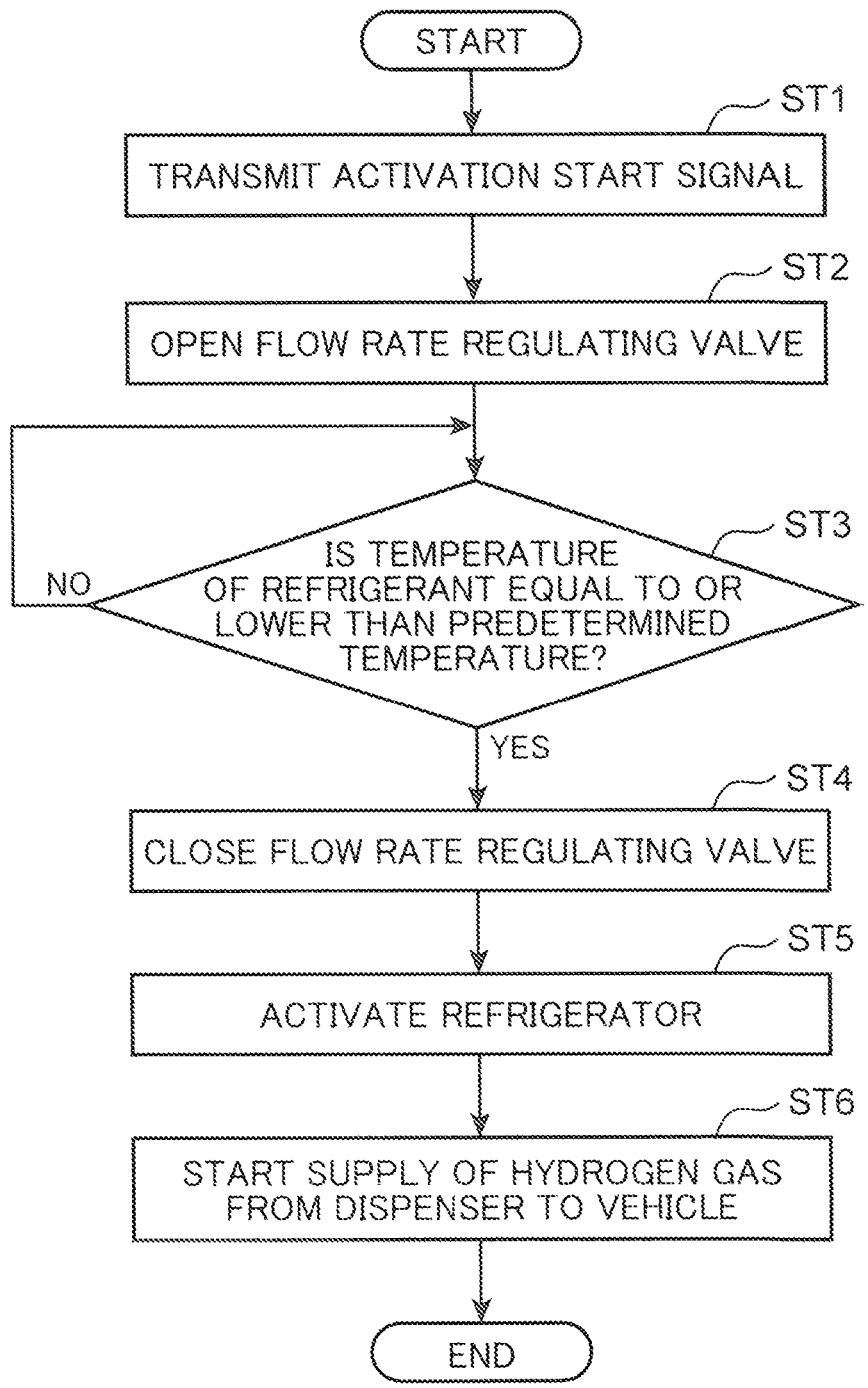
FIG. 3 is a diagram for describing a procedure for starting an operation of the gas supply device according to the first embodiment.

A flowchart illustrated in FIG. 3 indicates an operation method when activating the hydrogen station 10 again and supplying the hydrogen gas from the dispenser 11 to the tank of the vehicle 13. This flowchart indicates control when the hydrogen station 10 is activated again in a state where, for example, the hydrogen station 10 is stopped at night and the temperature of the refrigerant in the refrigerant flow path 261 is increased to an extent similar to the outside air by external heat input. Therefore, at a start point in FIG. 3, the supply path valve members 252a to 252c and the flow rate regulating valve 267 are closed, and the pump 262 and the refrigerator 263 are stopped.

A worker at the hydrogen station 10 performs, for example, an input operation of an unillustrated activation switch of the hydrogen station 10. This starts the activation of the hydrogen station 10. In the present embodiment, a state where the hydrogen station 10 has been activated refers to a state where the hydrogen gas can be supplied from the dispenser 11 to the tank of the vehicle 13.

When the worker performs the input operation of the activation switch, an activation start signal is transmitted from the activation switch to the control unit 27 of the gas supply device 2 (step ST1). Accordingly, the control unit 27 performs activation control of the pump 262 and the refrigerator 263, and opening regulating control of the flow rate regulating valve 267 by the following procedure. This makes it possible to supply the hydrogen gas from the dispenser 11 to the tank of the vehicle 13.

Upon receipt of the activation start signal in step ST1, the control unit 27 performs activation control of the pump 262 and performs control to open the flow rate regulating valve 267 at a predetermined opening (step ST2). Accordingly, the refrigerant circulates in the refrigerant flow path 261, and the liquid nitrogen in the liquefied gas tank 265 flows through the liquefied gas flow path 266 at a predetermined flow rate according to the opening of the flow rate regulating valve 267. At this time, in the heat exchanger A3, heat is exchanged between the refrigerant flowing through the circulation path 261a and the liquid nitrogen flowing through the heat exchanger portion 266a. Accordingly, the liquid nitrogen is vaporized, thereby generating a nitrogen gas. In the heat exchanger A3, the refrigerant flowing through the circulation path 261a is cooled by the latent heat of vaporization of the liquid nitrogen.

By opening the flow rate regulating valve 267 in step ST2, part of the nitrogen gas flowing from the heat exchanger portion 266a into the tank introduction portion 266b is introduced into the refrigerant tank 261b and the casing of the pump 262. Meanwhile, the remaining nitrogen gas is discharged from the discharge portion 266f. Accordingly, while the flow rate regulating valve 267 is open, the nitrogen gas fills the refrigerant tank 261b and the casing of the pump 262.

After the flow rate regulating valve 267 is opened in step ST2 and the cooling of the refrigerant flowing through the refrigerant flow path 261 is started by the latent heat of the nitrogen gas flowing through the heat exchanger portion 266a, the control unit 27 determines whether the temperature of the refrigerant is equal to or lower than a predetermined temperature set in advance (step ST3). Specifically, for example, the control unit 27 receives the temperature information detected by the temperature sensor T1 attached to the refrigerant flow path 261, and based on the temperature information, the control unit 27 determines whether the temperature of the refrigerant is equal to or lower than the predetermined temperature set in advance. Note that the predetermined temperature is set at a temperature of an extent to which the hydrogen gas before being discharged from the dispenser 11 can be sufficiently cooled in the heat exchanger A1.

When the control unit 27 determines that the temperature of the refrigerant exceeds the predetermined temperature set in advance (NO in step ST3), the control unit 27 continues cooling the refrigerant in the heat exchanger portion 266a without performing new control until the temperature of the refrigerant becomes equal to or lower than the predetermined temperature.

On the other hand, when the control unit 27 determines that the temperature of the refrigerant is equal to or lower than the predetermined temperature set in advance (YES in step ST3), the control unit 27 performs control to close the flow rate regulating valve 267 (step ST4). Accordingly, the outflow of the liquid nitrogen from the liquefied gas tank 265 to the downstream side of the liquefied gas flow path 266 is stopped, and the cooling of the refrigerant in the heat exchanger portion 266a ends.

Next, the control unit 27 performs activation control of the refrigerator 263 (step ST5). Accordingly, the refrigerant in the refrigerant flow path 261 is cooled in the heat exchanger A2 by the cooling fluid flowing through the refrigerator 263. That is, even if the temperature of the refrigerant in the refrigerant flow path 261 rises by the heat exchange with the hydrogen gas in the heat exchanger A1, the refrigerant is cooled by the cooling fluid in the heat exchanger A2 and can maintain the predetermined temperature. Then, through the steps of step ST1 to step ST5, the supply of the hydrogen gas from the dispenser 11 to the tank of the vehicle 13 is permitted, and the hydrogen station 10 is activated.

Note that in the present embodiment, the control unit 27 performs control to close the flow rate regulating valve 267 in step ST4, and thereafter performs control to activate the refrigerator 263 in step ST5; however, this is not restrictive. The control unit 27 may perform the closing control of the flow rate regulating valve 267 and the activation control of the refrigerator 263 at the same time, or may perform the closing control of the flow rate regulating valve 267 after performing the activation control of the refrigerator 263. That is, if step ST4 is performed in a case of YES in step ST3, the order of step ST4 and step ST5 is not particularly limited.

When the hydrogen station is activated through step ST1 to step ST5, the worker starts the supply of hydrogen gas from the dispenser 11 to the tank of the vehicle 13 (step ST6). Specifically, upon receipt of a hydrogen gas supply signal by the worker's operation, the control unit 27 performs control to open one of the supply path valve members 252a to 252c. Accordingly, the hydrogen gas is supplied from one of the accumulators 241 to 243 to the dispenser 11. Accordingly, the dispenser 11 discharges the hydrogen gas based on a predetermined protocol, and the tank of the vehicle 13 is filled with the hydrogen gas.

As described above, in the gas supply device 2 according to the present embodiment, when activating the hydrogen station 10, the control unit 27 first performs control to open the flow rate regulating valve 267. This causes liquid nitrogen to flow through the liquefied gas flow path 266. At this time, in the cooling device 264, the liquid nitrogen is vaporized by the heat exchange between the refrigerant in the refrigerant flow path 261 and the liquid nitrogen in the liquefied gas flow path 266. Accordingly, the temperature of the refrigerant can be quickly lowered. Therefore, the gas supply device 2 can shorten the time required for lowering the temperature of the refrigerant to an extent to which the hydrogen gas before being discharged from the dispenser 11 can be sufficiently cooled, and the gas supply device 2 can reduce the time required for activating the hydrogen station 10. Moreover, the gas supply device 2 includes the refrigerator 263 in addition to the cooling device 264, and the control unit 27 performs control to open the flow rate regulating valve 267 so as to activate the cooling device 264. Subsequently, when the refrigerant flowing through the refrigerant flow path 261 is cooled to a predetermined temperature of an extent to which the hydrogen gas before being discharged from the dispenser 11 can be sufficiently cooled, the control unit 27 activates the refrigerator 263 while stopping the cooling device 264. Accordingly, after the activation of the hydrogen station 10, the refrigerant flowing through the refrigerant flow path 261 is cooled only by the refrigerator 263. This makes it possible to reduce a supply amount of the liquid nitrogen to the refrigerant tank 261b of the cooling device 264.

Furthermore, in the gas supply device 2 according to the present embodiment, the nitrogen gas generated from the liquid nitrogen by the heat exchange between the refrigerant and the liquid nitrogen in the heat exchanger portion 266a flows into the refrigerant tank 261b through the tank introduction portion 266b. This allows the gas supply device 2 to reduce the possibility that the refrigerant stored in the refrigerant tank 261b touches the air. That is, it is possible to inhibit corrosion of the refrigerant by using the nitrogen gas for cooling the refrigerant when activating the hydrogen station 10.

Furthermore, in the gas supply device 2 according to the present embodiment, the nitrogen gas generated by the heat exchange between the refrigerant and liquid nitrogen in the heat exchanger portion 266a is introduced into the casing of the pump 262 through the pump introduction portion 266c. Here, the casing of the pump 262 is cooled by the refrigerant passing through the inside of the pump 262. Therefore, when air enters the casing of the pump 262, condensation may occur. However, in the gas supply device 2, since the nitrogen gas is introduced into the casing of the pump 262, the possibility of air entering the casing can be reduced, thereby inhibiting the occurrence of condensation in the casing.

Note that in the present embodiment, the liquefied gas flow path 266 includes the tank introduction portion 266b and the pump introduction portion 266c so as to introduce the nitrogen gas into both the refrigerant tank 261b and the casing of the pump 262, but this is not restrictive. The liquefied gas flow path 266 may include only one of the tank introduction portion 266b and the pump introduction portion 266c. In this case, the nitrogen gas is introduced into only one of the refrigerant tank 261b and the casing of the pump 262. Also, the liquefied gas flow path 266 may include neither the tank introduction portion 266b nor the pump introduction portion 266c. In this case, all of the nitrogen gas generated in the heat exchanger portion 266a is discharged from the discharge portion 266f.

In the present embodiment, when the condition that the temperature of the refrigerant is equal to or lower than the predetermined temperature set in advance is satisfied in step ST3, the control unit 27 performs control to close the flow rate regulating valve 267 in step ST4. However, the determination condition in step ST3 is not limited to the temperature of the refrigerant. The control unit 27 may not determine whether the condition that the temperature of the refrigerant is equal to or lower than the predetermined temperature set in advance is satisfied, but for example, the control unit 27 may determine whether a condition that a predetermined time set in advance has elapsed after performing control to open the flow rate regulating valve 267 is satisfied. In this case, the predetermined time is a time set in advance as a time required for reaching a temperature of an extent to which the refrigerant can sufficiently cool the hydrogen gas before being discharged from the dispenser, after opening the flow rate regulating valve 267 in step ST2 to start cooling the refrigerant by the cooling device 264. If the elapsed time since the flow rate regulating valve 267 is opened is used as the determination condition in step ST3, there is no need to attach the temperature sensor T1 to the refrigerant flow path 261, leading to reduction in the number of parts.

Furthermore, in the present embodiment, the control unit 27 that receives the activation start signal of the hydrogen station 10 activates the gas supply device 2 according to the flowchart of FIG. 3, but this is not restrictive. The worker may manually execute the flowchart of FIG. 3 that is to be executed by the control unit 27.

Second Embodiment

Next, a gas supply device 2 according to a second embodiment will be described with reference to FIG. 4. Note that the present embodiment will describe only portions different from the first embodiment, and descriptions of the same structure, operation, and effect as those of the first embodiment will be omitted.

In the second embodiment, a configuration of a hydrogen station 10 is similar to the configuration of the hydrogen station 10 of the first embodiment, but the second embodiment is different from the first embodiment in a method for operating the hydrogen station 10.

Figure 4:
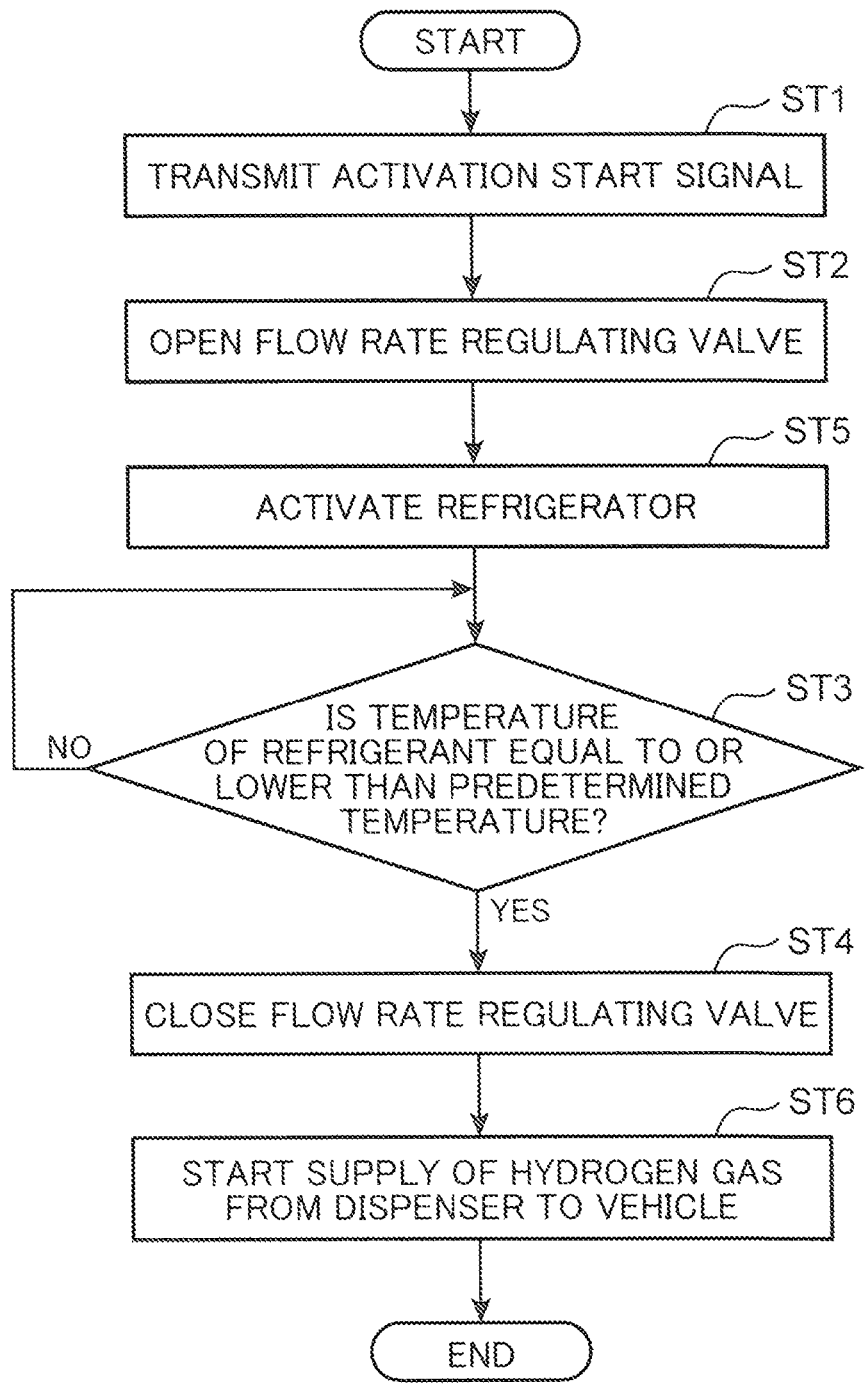
FIG. 4 is a diagram for describing a procedure for starting an operation of a gas supply device according to a second embodiment.

In the second embodiment, as illustrated in FIG. 4, upon receipt of an activation start signal transmitted in step ST1, while opening a flow rate regulating valve 267 (step ST2), a control unit 27 performs control to activate a refrigerator 263 (step ST5). Accordingly, a refrigerant flowing through a refrigerant flow path 261 is cooled by the refrigerator 263 and is also cooled by latent heat of vaporization of liquefied nitrogen in a heat exchanger portion 266a of a cooling device 264.

Note that in the second embodiment, the control unit 27 performs control to open the flow rate regulating valve 267 in step ST2, and thereafter performs control to activate the refrigerator 263 in step ST5; however, this is not restrictive. The control unit 27 may perform control to open the flow rate regulating valve 267 and the activation control of the refrigerator 263 at the same time, or may perform control to open the flow rate regulating valve 267 after performing the activation control of the refrigerator.

Through step ST2 and step ST5, after cooling of the refrigerant in the refrigerant flow path 261 is started, the control unit 27 determines whether a temperature of the refrigerant is equal to or lower than a predetermined temperature set in advance (step ST3). As a result, when the control unit 27 determines that the temperature of the refrigerant exceeds the predetermined temperature (NO in step ST3), the control unit 27 returns to step ST3 again without performing new control. Accordingly, both cooling of the refrigerant by the refrigerator 263 and cooling of the refrigerant in the heat exchanger portion 266a are continued until the temperature of the refrigerant becomes equal to or lower than the predetermined temperature.

On the other hand, when the control unit 27 determines that the temperature of the refrigerant is equal to or lower than the predetermined temperature (YES in step ST3), the control unit 27 performs control to close the flow rate regulating valve 267 (step ST4). Accordingly, although cooling of the refrigerant in the heat exchanger portion 266a of the cooling device 264 is stopped, cooling of the refrigerant by the refrigerator 263 is continued. Then, through these steps, the hydrogen station 10 is activated, and supply of a hydrogen gas from a dispenser 11 to a tank of a vehicle 13 is permitted. Subsequently, a worker's operation causes the supply of the hydrogen gas to be started from the dispenser 11 to the tank of the vehicle 13 (step ST6).

In the gas supply device 2 according to the second embodiment, when activating the hydrogen station 10, the control unit 27 first performs control to activate the cooling device 264 and the refrigerator 263. Accordingly, the refrigerant flowing through the refrigerant flow path 261 is cooled by the refrigerator 263 and is further cooled by latent heat of vaporization of liquid nitrogen in the cooling device 264. Therefore, it is possible to shorten the time required for lowering the temperature of the refrigerant to an extent to which the hydrogen gas before being discharged from the dispenser 11 can be sufficiently cooled, and to reduce the time required for activating the hydrogen station 10. Moreover, after performing control to activate the cooling device 264 and the refrigerator 263, when it is determined that the refrigerant has been cooled to an extent to which the hydrogen gas before being discharged from the dispenser 11 can be sufficiently cooled, the control unit 27 performs control to close the flow rate regulating valve 267 so as to stop the cooling device 264. Accordingly, after the activation of the hydrogen station 10, the refrigerant flowing through the refrigerant flow path 261 is cooled only by the refrigerator 263, and it is possible to reduce the supply amount of liquid nitrogen into the cooling device 264.

Note that in the present embodiment, the control unit 27 that receives the activation start signal of the hydrogen station 10 activates the gas supply device 2 according to the flowchart of FIG. 4, but this is not restrictive. The worker may manually execute the flowchart of FIG. 4 that is to be executed by the control unit 27.

Third Embodiment

Next, a gas supply device 2 according to a third embodiment will be described with reference to FIGS. 5 and 6. Note that the present embodiment will describe only portions different from the first embodiment, and descriptions of the same structure, operation, and effect as those of the first embodiment will be omitted.

In the third embodiment, a structure of a cooling device 264 is different from a configuration of a cooling device 264 in the first embodiment.

In the third embodiment, the cooling device 264 includes a liquefied gas tank 265, a liquefied gas flow path 268, and a flow rate regulating valve 267. The liquefied gas flow path 268 introduces liquid nitrogen stored in the liquefied gas tank 265 into a refrigerant tank 261b to cool a refrigerant in the refrigerant tank 261b.

Figure 5:
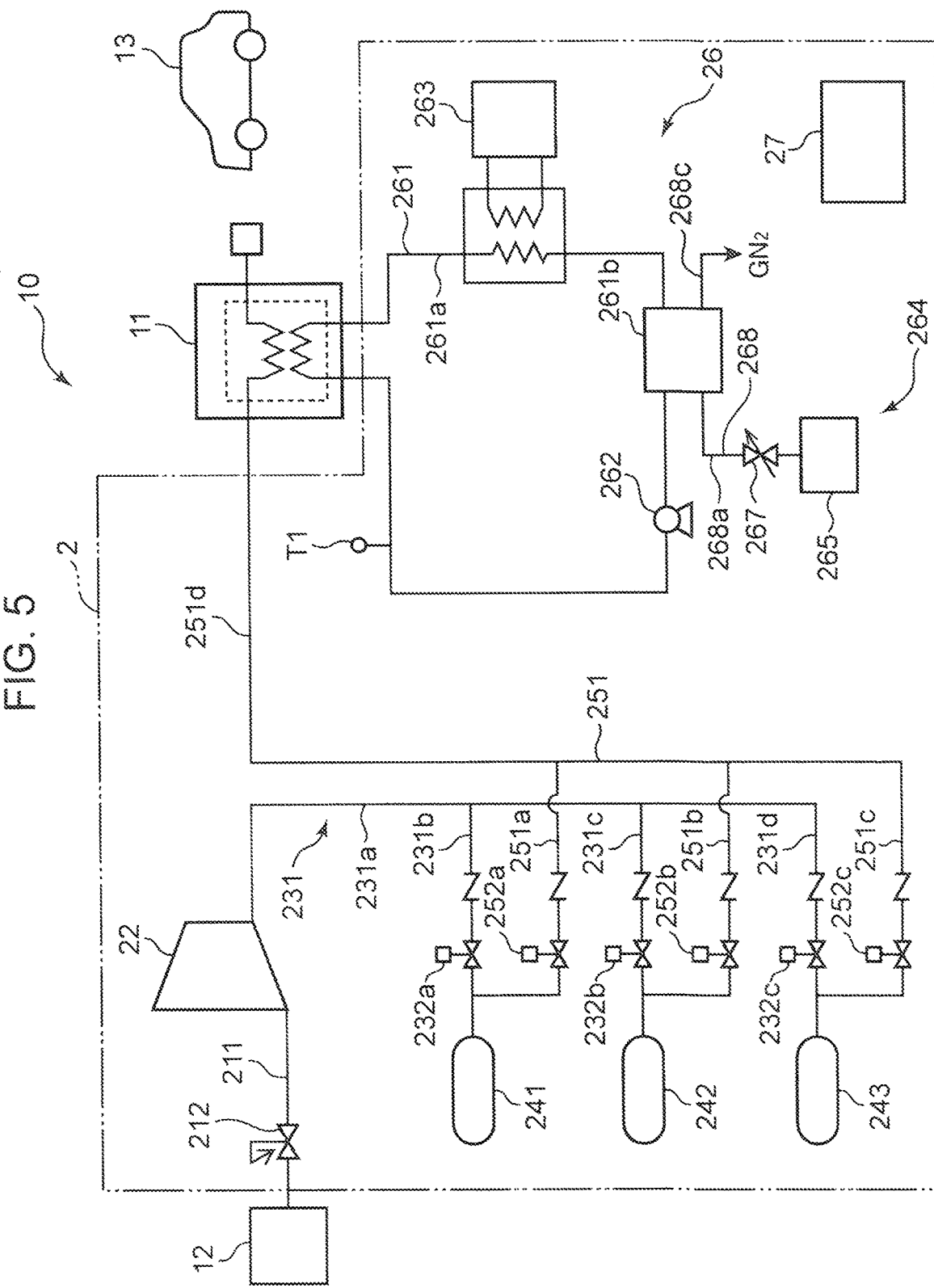
FIG. 5 is a schematic diagram illustrating a configuration of a gas supply device according to a third embodiment.
Figure 6:
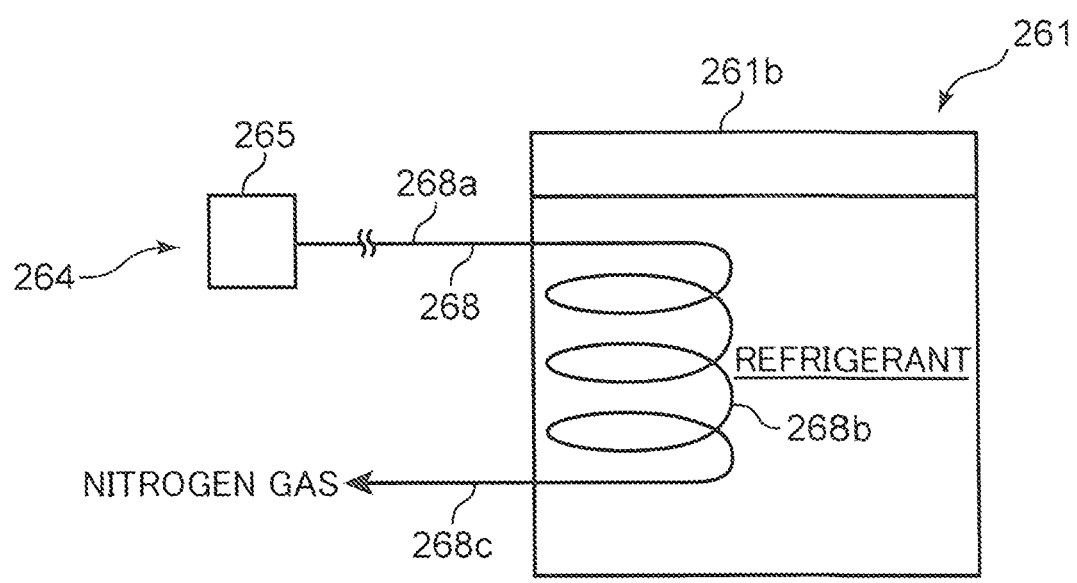
FIG. 6 is a schematic diagram illustrating a configuration of a refrigerant tank provided in the gas supply device according to the third embodiment.

Specifically, as illustrated in FIGS. 5 and 6, the liquefied gas flow path 268 includes an introduction side flow path 268a, an intra-tank flow path 268b, and a lead-out side flow path 268c.

One end of the introduction side flow path 268a is connected to the liquefied gas tank 265, whereas the other end of the introduction side flow path 268a is connected to an inlet of the refrigerant tank 261b. The flow rate regulating valve 267 is attached to the introduction side flow path 268a.

One end of the intra-tank flow path 268b is connected to the introduction side flow path 268a, whereas the other end of the intra-tank flow path 268b is connected to a lead-out port of the refrigerant tank 261b. The intra-tank flow path 268b is disposed so as to form, for example, a coil shape at a position where the intra-tank flow path 268b is immersed in the refrigerant stored in the refrigerant tank 261b.

One end of the lead-out side flow path 268c is connected to the other end of the intra-tank flow path 268b, whereas the other end of the lead-out side flow path 268c is located outside the refrigerant tank 261b.

In the third embodiment, when a control unit 27 performs control to open the flow rate regulating valve 267, the liquid nitrogen stored in the liquefied gas tank 265 flows through the introduction side flow path 268a into the intra-tank flow path 268b in the refrigerant tank 261b. Accordingly, the liquid nitrogen is vaporized by heat exchange with the refrigerant in the intra-tank flow path 268b to become a nitrogen gas. At this time, the refrigerant is cooled by latent heat of vaporization of the liquid nitrogen. Then, the nitrogen gas in the intra-tank flow path 268b passes through the lead-out side flow path 268c and is discharged to the outside of the refrigerant tank 261b. In this case, it can be said that the intra-tank flow path 268b has functions similar to functions of the heat exchanger A3 in the first embodiment.

Fourth Embodiment

Figure 7:
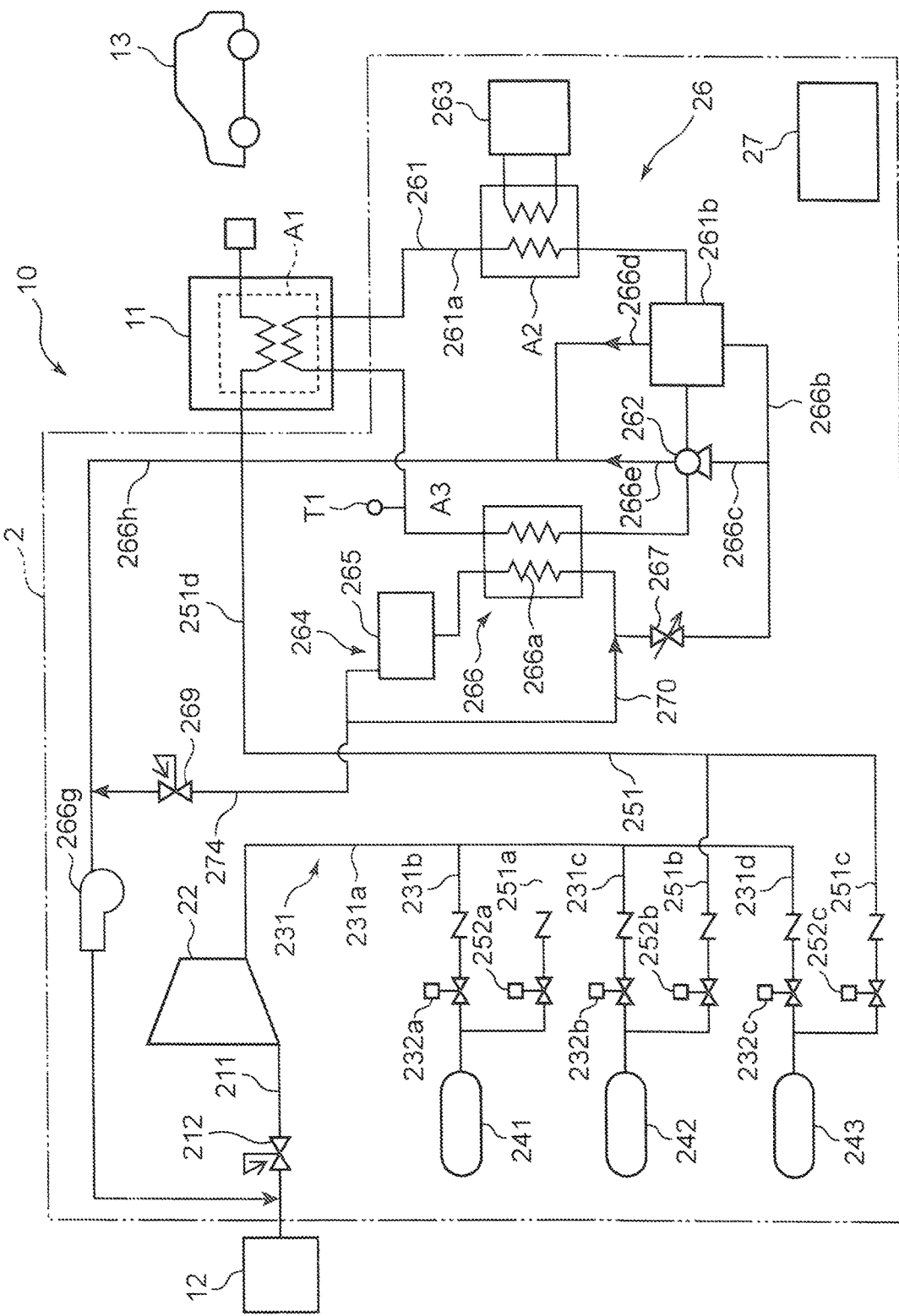
FIG. 7 is a schematic diagram illustrating a configuration of a gas supply device according to a fourth embodiment.

Next, a gas supply device 2 according to a fourth embodiment will be described with reference to FIG. 7. Note that the present embodiment will describe only portions different from the first embodiment, and descriptions of the same structure, operation, and effect as those of the first embodiment will be omitted.

The first embodiment has a configuration to vaporize, in the heat exchanger portion 266a, a liquefied gas (liquid nitrogen) stored in the liquefied gas tank 265 and to discharge the vaporized gas to the outside of the refrigerant flow path 261 via the refrigerant tank 261b and the pump 262. In contrast, in the fourth embodiment, liquefied hydrogen is employed as a liquefied gas to be stored in a liquefied gas tank 265 and vaporized in a heat exchanger portion 266a. The gas supply device 2 of the fourth embodiment has a configuration to introduce a hydrogen gas generated in the heat exchanger portion 266a into an inflow side flow path 211 via a refrigerant tank 261b and a pump 262. That is, in the fourth embodiment, a tank lead-out portion 266d and a pump lead-out portion 266e join. The gas supply device 2 includes a return flow path 266h that connect between a joining portion between the tank lead-out portion 266d and the pump lead-out portion 266e, and a portion in the inflow side flow path 211 on an upstream side of an inflow side valve member 212. A blower 266g for pressure-feeding the hydrogen gas flowing through the return flow path 266h is provided in an intermediate portion of the return flow path 266h.

A discharge portion 266f is provided in the first embodiment, but is not provided in the fourth embodiment. Meanwhile, the gas supply device 2 according to the fourth embodiment includes a boil-off gas flow path 274 that leads a boil-off gas (hydrogen gas) generated in the liquefied gas tank 265 by external natural heat input from the outside to the return flow path 266h. The boil-off gas flow path 274 extends from an upper portion of the liquefied gas tank 265, and is connected to a portion in the return flow path 266h on an upstream side of a portion where the blower 266g is provided. In the boil-off gas flow path 274, a back pressure valve 269 for autonomously regulating the pressure on a primary side (upstream side) of the hydrogen gas (boil-off gas) flowing through the boil-off gas flow path 274 is provided. The back pressure valve 269 is configured to be closed until the pressure on the primary side (upstream side) of the hydrogen gas (boil-off gas) flowing through the boil-off gas flow path 274 reaches a certain value, and to be opened when the pressure exceeds the certain value. A branch flow path 270 is provided to connect between a portion between the back pressure valve 269 and the liquefied gas tank 265 in the boil-off gas flow path 274, and a portion between the heat exchanger portion 266a and a flow rate regulating valve 267 in a tank introduction portion 266b.

Also in this fourth embodiment, as in the first embodiment, the method for operating the hydrogen station 10 illustrated in FIG. 3 can be employed. However, in the fourth embodiment, when opening the flow rate regulating valve 267, a control unit 27 activates the blower 266g in synchronization therewith. Also, when completely closing the flow rate regulating valve 267, the control unit 27 stops the blower 266g in synchronization therewith.

As described above, the gas supply device 2 of the fourth embodiment vaporizes the liquefied hydrogen stored in the liquefied gas tank 265 in the heat exchanger portion 266a, and introduces the vaporized liquefied hydrogen into the inflow side flow path 211 via the refrigerant tank 261b and the pump 262. Therefore, in the fourth embodiment, it is possible to supply the hydrogen gas to a vehicle 13 via a compressor 22 and a dispenser 11 without releasing or leaking the hydrogen gas to the outside air. The fourth embodiment can obtain the same effects as in the first embodiment, i.e., corrosion of the refrigerant can be inhibited by the hydrogen gas introduced into a casing of the pump 262, and condensation can be inhibited by the hydrogen gas introduced into the casing of the pump 262. It is possible to use, without waste, the hydrogen gas generated as the so-called boil-off gas in the liquefied gas tank 265 through the boil-off gas flow path 274 and the branch flow path 270.

Fifth Embodiment

Figure 8:
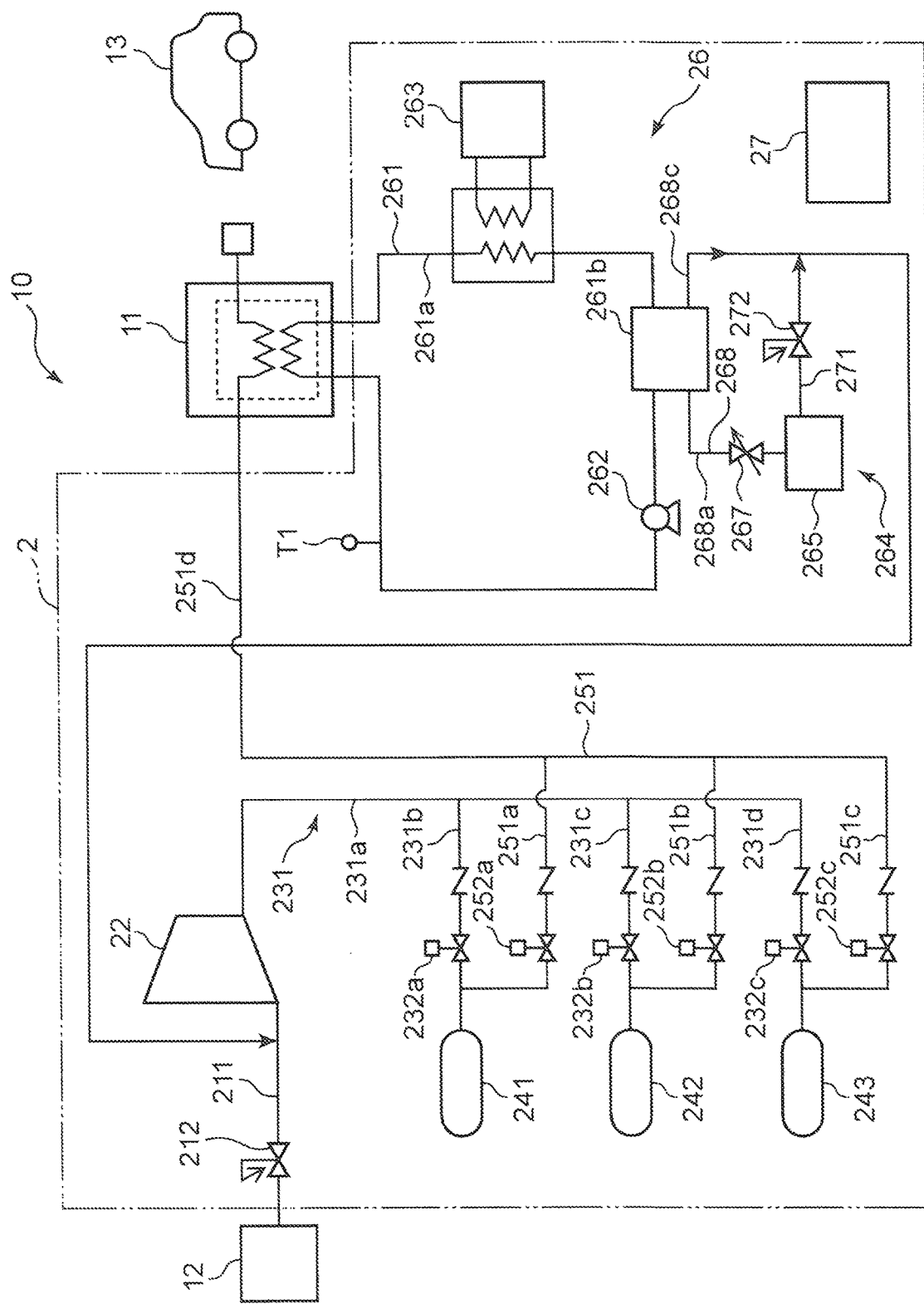
FIG. 8 is a schematic diagram illustrating a configuration of a gas supply device according to a fifth embodiment.

Next, a gas supply device 2 according to a fifth embodiment will be described with reference to FIG. 8. Note that the present embodiment will describe only portions different from the third embodiment, and descriptions of the same structure, operation, and effect as those of the third embodiment will be omitted.

In the third embodiment and the fifth embodiment, liquid hydrogen is stored in a liquefied gas tank 265. The liquid hydrogen is vaporized by heat exchange with a refrigerant in an intra-tank flow path 268b in a refrigerant tank 261b (intra-tank flow path 268b is not illustrated in FIG. 8). In the third embodiment, one end of a lead-out side flow path 268c is connected to the other end of the intra-tank flow path 268b, whereas the other end of the lead-out side flow path 268c is open to the outside of the refrigerant tank 261b. In contrast, in the fifth embodiment, one end of the lead-out side flow path 268c is connected to the other end of the intra-tank flow path 268b, and the other end of the lead-out side flow path 268c is connected to a portion downstream of an inflow side valve member 212 in an inflow side flow path 211 (portion upstream of a compressor 22). The gas supply device 2 of the fifth embodiment includes a boil-off gas flow path 271 extending from an upper portion of the liquefied gas tank 265. The boil-off gas flow path 271 leads a hydrogen gas (boil-off gas) vaporized by external natural heat input in the liquefied gas tank 265 to an intermediate portion of the lead-out side flow path 268c. In the boil-off gas flow path 271, a back pressure valve 272 for autonomously regulating a pressure on a primary side (upstream side) of the hydrogen gas (boil-off gas) flowing through the boil-off gas flow path 271 is provided. The back pressure valve 272 is configured to be closed until the pressure on the primary side (upstream side) of the hydrogen gas (boil-off gas) flowing through the boil-off gas flow path 271 reaches a certain value, and to be opened when the pressure exceeds the certain value.

In the fifth embodiment, in addition to the same effects as in the first embodiment, by introducing the hydrogen gas into the inflow side flow path 211, it is possible to supply the hydrogen gas to a vehicle 13 via the compressor 22 and a dispenser 11 without releasing or leaking the hydrogen gas to the outside air. Also, it is possible to use, without waste, through the boil-off gas flow path 271, the hydrogen gas generated as the so-called boil-off gas in the liquefied gas tank 265.

Here, the embodiments will be outlined.

(1) A gas supply device according to the embodiments is a gas supply device for supplying a gas to a dispenser of a gas station. The gas supply device includes: a refrigerant flow path through which a refrigerant for cooling a gas before being discharged from the dispenser flows; a refrigerator configured to cool the refrigerant; a cooling device configured to cool the refrigerant by latent heat of a liquefied gas; and a control unit configured to perform control to activate the cooling device and the refrigerator when activating of the gas station. The control unit performs control to stop the cooling device when a condition set in advance is satisfied.

In the gas supply device, when activating the gas station, the control unit performs control to activate the cooling device and the refrigerator. Therefore, the temperature of the refrigerant can be quickly lowered by the latent heat of vaporization of the liquefied gas vaporized by the heat exchange between the refrigerant in the refrigerant flow path and the liquefied gas. Therefore, the gas supply device can shorten the time required for lowering the temperature of the refrigerant to an extent to which the gas before being discharged from the dispenser can be sufficiently cooled. Accordingly, it is possible to reduce the time required for activating the gas station. Since the cooling device is stopped when the condition set in advance is satisfied, the supply amount of the liquefied gas to the cooling device can be reduced. Here, the condition set in advance refers to, for example, a condition determined with the elapsed time since the activation of the cooling device, the temperature detected by a temperature sensor provided in the refrigerant flow path, and the like. The refrigerant flowing through the refrigerant flow path is cooled by the cooling device until the condition is satisfied. By satisfying this condition, the refrigerant flowing through the refrigerant flow path is cooled to an extent to which the refrigerant can sufficiently cool the gas before being discharged from the dispenser.

(2) The control unit may be configured to first perform control to activate the cooling device, and thereafter to perform control to stop the cooling device and control to activate the refrigerator when the condition set in advance is satisfied, in activating the gas station.

In the gas supply device, when activating the gas station, the control unit first performs control to activate the cooling device. With this operation, the cooling device can quickly lower the temperature of the refrigerant by the latent heat of vaporization of the liquefied gas vaporized by the heat exchange between the refrigerant in the refrigerant flow path and the liquefied gas. Moreover, after performing control to activate the cooling device, the control unit performs control to activate the refrigerator while stopping the cooling device when the condition set in advance is satisfied. That is, in the gas supply device, when it is determined that the refrigerant flowing through the refrigerant flow path has been cooled to an extent to which the gas before being discharged from the dispenser can be sufficiently cooled, the control unit activates the refrigerator while stopping the cooling device. That is, since the refrigerator is not activated until the above condition is satisfied, the power of the refrigerator can be suppressed. After the activation of the gas station, since the refrigerant flowing through the refrigerant flow path is cooled only by the refrigerator, it is possible to reduce the supply amount of the liquefied gas to the cooling device.

(3) The control unit may be configured to perform control to activate the cooling device and the refrigerator, and thereafter to perform control to stop the cooling device when the condition set in advance is satisfied, in activating the gas station.

In the gas supply device, when activating the gas station, the control unit first performs control to activate the cooling device and the refrigerator. With this operation, the refrigerant flowing through the refrigerant flow path is cooled by the refrigerator and is further cooled by latent heat of the liquefied gas in the cooling device. Therefore, the gas supply device can shorten the time required for lowering the temperature of the refrigerant to an extent to which the gas before being discharged from the dispenser can be sufficiently cooled. Accordingly, it is possible to reduce the time required for activating the gas station. Moreover, after performing control to activate the cooling device and the refrigerator, the control unit performs control to stop the cooling device when the condition set in advance is satisfied. With this operation, after the activation of the gas station, since the refrigerant flowing through the refrigerant flow path is cooled only by the refrigerator, it is possible to reduce the supply amount of the liquefied gas to the cooling device.

(4) The refrigerant flow path may include a refrigerant tank that stores the refrigerant. The cooling device may include a liquefied gas flow path through which the liquefied gas flows. The liquefied gas flow path may include a heat exchanger portion configured to perform heat exchange between the refrigerant and the liquefied gas, and a tank introduction portion connecting the heat exchanger portion and the refrigerant tank such that the gas generated by vaporization of the liquefied gas in the heat exchanger portion flows into the refrigerant tank.

In the gas supply device, the gas generated from the liquefied gas by the heat exchange between the refrigerant and the liquefied gas in the heat exchanger portion flows into the refrigerant tank through the tank introduction portion. Therefore, the gas supply device can reduce the possibility that the refrigerant in the refrigerant tank touches the air by using the liquefied gas for cooling the refrigerant when activating the gas station. This can inhibit corrosion of the refrigerant.

(5) The gas supply device may further include a pump connected to the refrigerant flow path. The refrigerant flow path may include a refrigerant tank that stores the refrigerant. The cooling device may include a liquefied gas flow path through which the liquefied gas flows. The liquefied gas flow path may include a heat exchanger portion configured to perform heat exchange between the refrigerant and the liquefied gas, and a pump introduction portion connecting the heat exchanger portion and the pump such that the gas generated by vaporization of the liquefied gas in the heat exchanger portion flows into a casing of the pump.

Since the casing of the pump is cooled to a predetermined temperature by the refrigerant passing through the inside of the pump, if air enters the casing of the pump, condensation may occur. However, in the gas supply device, the gas generated by the heat exchange between the refrigerant and the liquefied gas in the heat exchanger portion of the liquefied gas flow path flows into the pump through the pump introduction portion of the liquefied gas flow path. This will reduce the possibility of air entering the casing of the pump. Therefore, it is possible to inhibit the occurrence of condensation in the casing of the pump (6) The cooling device may include a flow rate regulating valve disposed in the liquefied gas flow path. In this case, the control unit may be configured to perform control to open the flow rate regulating valve in the control to activate the cooling device.

In this gas supply device, the liquefied gas flows through the liquefied gas flow path as the flow rate regulating valve is opened. This allows the liquefied gas flowing through the liquefied gas flow path to cool the refrigerant flowing through the refrigerant flow path.

(7) The gas supply device may include a temperature sensor configured to detect a temperature of the refrigerant flowing through the refrigerant flow path. In this case, the control unit may be configured to perform control to stop the cooling device when the temperature detected by the temperature sensor becomes equal to or lower than a temperature set in advance.

This gas supply device can adjust the start of the stop control of the cooling device based on the refrigerant temperature.

(8) A method for starting an operation of a gas supply device according to the embodiments is a method for starting an operation of a gas supply device including: a refrigerant flow path through which a refrigerant for cooling a gas before being discharged from a dispenser of a gas station flows; a refrigerator configured to cool the refrigerant; and a cooling device configured to cool the refrigerant by latent heat of a liquefied gas. The method includes: performing control to activate the cooling device; and performing control to activate the refrigerator while performing control to stop the cooling device when a predetermined condition is satisfied after activating the cooling device.

In the method for starting an operation of a gas supply device, by activating the cooling device, it is possible to rapidly lower the temperature of the refrigerant in the refrigerant flow path by using the latent heat of the liquefied gas in the cooling device. Therefore, in the method for starting an operation of a gas supply device, it is possible to shorten the time required for lowering the temperature of the refrigerant to an extent to which the gas before being discharged from the dispenser can be sufficiently cooled. Accordingly, it is possible to reduce the time required for activating the gas station. Moreover, in the method for starting an operation of a gas supply device, after activating the cooling device, when the predetermined condition is satisfied, the cooling device is stopped and the refrigerator is activated. Here, whether the predetermined condition is satisfied can be determined, for example, depending on whether a predetermined time has elapsed since the activation of the cooling device, or whether the temperature of the refrigerant flowing through the refrigerant flow path has reached a predetermined temperature. That is, in the method for starting an operation of a gas supply device, after the cooling device is activated, when the predetermined condition is satisfied, the refrigerant flowing through the refrigerant flow path is cooled to an extent to which the gas before being discharged from the dispenser can be sufficiently cooled. In this state, the cooling device is stopped and the refrigerator is activated. This makes it possible to cool the refrigerant after the activation of the gas station only by the refrigerator. Therefore, in the method for starting an operation of a gas supply device, the supply amount of the liquefied gas to the cooling device can be reduced.

(9) A method for starting an operation of a gas supply device according to the present invention is a method for starting an operation of a gas supply device including: a refrigerant flow path through which a refrigerant for cooling a gas before being discharged from a dispenser of a gas station flows; a refrigerator configured to cool the refrigerant; and a cooling device configured to cool the refrigerant by latent heat of a liquefied gas. The method includes: performing control to activate the cooling device and the refrigerator; and performing control to stop the cooling device when a predetermined condition is satisfied after activating the cooling device and the refrigerator.

In the method for starting an operation of a gas supply device, by activating the cooling device and the refrigerator, the refrigerant in the refrigerant flow path can be cooled by the refrigerator, and the refrigerant can also be cooled by the latent heat of the liquefied gas in the cooling device. Therefore, in the method for starting an operation of a gas supply device, it is possible to shorten the time required for lowering the temperature of the refrigerant to an extent to which the gas before being discharged from the dispenser can be sufficiently cooled. Accordingly, it is possible to reduce the time required for activating the gas station. Moreover, in the method for starting an operation of a gas supply device, after activating the cooling device, when the predetermined condition is satisfied, the cooling device is stopped. That is, in the method for starting an operation of a gas supply device, after activating the cooling device and the refrigerator, when the predetermined condition is satisfied, the refrigerant flowing through the refrigerant flow path is cooled to an extent to which the gas before being discharged from the dispenser can be sufficiently cooled. In this state, the cooling device is stopped. This makes it possible to cool the refrigerant after the activation of the gas station only by the refrigerator. Therefore, in the method for starting an operation of a gas supply device, the supply amount of the liquefied gas to the cooling device can be reduced.

(10) In the method for starting an operation, a temperature of the refrigerant flowing through the refrigerant flow path may be detected by a temperature sensor. In this case, when the temperature detected by the temperature sensor becomes equal to or lower than a temperature set in advance, control to stop the cooling device may be performed.

(11) In the method for starting an operation, control to open a liquefied gas flow path connected to a liquefied gas tank may be performed in the control to activate the cooling device.

(12) In the method for starting an operation, the liquefied gas may be vaporized in a heat exchanger portion with the refrigerant in the cooling device to generate the gas. In this case, the gas generated in the heat exchanger portion may flow into a refrigerant tank which is provided in the refrigerant flow path and in which the refrigerant is stored.

(13) In the method for starting an operation, the liquefied gas may be vaporized in a heat exchanger portion with the refrigerant in the cooling device to generate the gas. In this case, the gas generated in the heat exchanger portion may flow into a casing of a pump provided in the refrigerant flow path.

As described above, according to the embodiments, it is possible to reduce the time required for activating the gas station.

This application is based on Japanese Patent Application No. 2017-177595 filed in Japan Patent Office on Sep. 15, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A gas supply device for supplying a gas to a dispenser of a gas station, the gas supply device comprising:
   a refrigerant flow path through which a refrigerant for cooling all of a gas before being discharged from the dispenser flows;
   a refrigerator configured to cool the refrigerant in the refrigerant flow path;
   a cooling device configured to cool the refrigerant in the refrigerant flow path by latent heat of a liquefied gas; and
   a control unit configured to perform control to activate the cooling device and the refrigerator when the gas station is activated, wherein
   the control unit performs control to stop the cooling device when a condition set in advance is satisfied.

2. The gas supply device according to claim 1, wherein the control unit is configured to first perform control to activate the cooling device, and thereafter to perform control to stop the cooling device and control to activate the refrigerator when the condition set in advance is satisfied, in activating the gas station.

3. The gas supply device according to claim 1, wherein the control unit is configured to perform control to activate the cooling device and the refrigerator, and thereafter to perform control to stop the cooling device when the condition set in advance is satisfied, in activating the gas station.

4. The gas supply device according to claim 1, wherein
   the refrigerant flow path includes a refrigerant tank that stores the refrigerant,
   the cooling device includes a liquefied gas flow path through which the liquefied gas flows, and
   the liquefied gas flow path includes: a heat exchanger portion configured to perform heat exchange between the refrigerant and the liquefied gas; and a tank introduction portion connecting the heat exchanger portion and the refrigerant tank such that a gas generated by vaporization of the liquefied gas in the heat exchanger portion flows into the refrigerant tank.

5. The gas supply device according to claim 1, further comprising a pump connected to the refrigerant flow path, wherein
   the refrigerant flow path includes a refrigerant tank that stores the refrigerant,
   the cooling device includes a liquefied gas flow path through which the liquefied gas flows, and
   the liquefied gas flow path includes: a heat exchanger portion configured to perform heat exchange between the refrigerant and the liquefied gas; and a pump introduction portion connecting the heat exchanger portion and the pump such that a gas generated by vaporization of the liquefied gas in the heat exchanger portion flows into a casing of the pump.

6. The gas supply device according to claim 4, wherein
   the cooling device includes a flow rate regulating valve disposed in the liquefied gas flow path, and
   the control unit is configured to perform control to open the flow rate regulating valve in the control to activate the cooling device.

7. The gas supply device according to claim 5, wherein
   the cooling device includes a flow rate regulating valve disposed in the liquefied gas flow path, and
   the control unit is configured to perform control to open the flow rate regulating valve in the control to activate the cooling device.

8. The gas supply device according to claim 1, further comprising a temperature sensor configured to detect a temperature of the refrigerant flowing through the refrigerant flow path, wherein
   the control unit is configured to perform control to stop the cooling device when the temperature detected by the temperature sensor becomes equal to or lower than a temperature set in advance.

9. A method for starting an operation of a gas supply device including: a refrigerant flow path through which a refrigerant for cooling all of a gas before being discharged from a dispenser of a gas station flows; a refrigerator configured to cool the refrigerant in the refrigerant flow path; and a cooling device configured to cool the refrigerant in the refrigerant flow path by latent heat of a liquefied gas, the method comprising:
   performing control to activate the cooling device; and
   performing control to activate the refrigerator while performing control to stop the cooling device when a predetermined condition is satisfied after the cooling device is activated.

10. The method for starting an operation of a gas supply device according to claim 9, further comprising:
    detecting a temperature of the refrigerant flowing through the refrigerant flow path by a temperature sensor; and
    performing control to stop the cooling device when the temperature detected by the temperature sensor becomes equal to or lower than a temperature set in advance.

11. The method for starting an operation of a gas supply device according to claim 9, further comprising performing control to open a liquefied gas flow path connected to a liquefied gas tank in the control to activate the cooling device.

12. The method for starting an operation of a gas supply device according to claim 9, further comprising:
    vaporizing the liquefied gas in a heat exchanger portion with the refrigerant in the cooling device to generate a gas; and
    causing the gas generated in the heat exchanger portion to flow into a refrigerant tank which is provided in the refrigerant flow path and in which the refrigerant is stored.

13. The method for starting an operation of a gas supply device according to claim 9, further comprising:

vaporizing the liquefied gas in a heat exchanger portion with the refrigerant in the cooling device to generate a gas; and causing the gas generated in the heat exchanger portion to flow into a casing of a pump provided in the refrigerant flow path.

14. A method for starting an operation of a gas supply device including: a refrigerant flow path through which a refrigerant for cooling all of a gas before being discharged from a dispenser of a gas station flows; a refrigerator configured to cool the refrigerant in the refrigerant flow path; and a cooling device configured to cool the refrigerant in the refrigerant flow path by latent heat of a liquefied gas, the method comprising:

performing control to activate the cooling device and the refrigerator; and performing control to stop the cooling device when a predetermined condition is satisfied after the cooling device and the refrigerator are activated.

15. The method for starting an operation of a gas supply device according to claim 14, further comprising:

detecting a temperature of the refrigerant flowing through the refrigerant flow path by a temperature sensor; and performing control to stop the cooling device when the temperature detected by the temperature sensor becomes equal to or lower than a temperature set in advance.

16. The method for starting an operation of a gas supply device according to claim 14, further comprising performing control to open a liquefied gas flow path connected to a liquefied gas tank in the control to activate the cooling device.

17. The method for starting an operation of a gas supply device according to claim 14, further comprising:

vaporizing the liquefied gas in a heat exchanger portion with the refrigerant in the cooling device to generate a gas; and causing the gas generated in the heat exchanger portion to flow into a refrigerant tank which is provided in the refrigerant flow path and in which the refrigerant is stored.

18. The method for starting an operation of a gas supply device according to claim 14, further comprising:

vaporizing the liquefied gas in a heat exchanger portion with the refrigerant in the cooling device to generate a gas; and causing the gas generated in the heat exchanger portion to flow into a casing of a pump provided in the refrigerant flow path.

* * * * *